United States Patent
Tsourapas et al.

(10) Patent No.: US 9,856,781 B2
(45) Date of Patent: Jan. 2, 2018

(54) SUPERCHARGER ASSEMBLY WITH INDEPENDENT SUPERCHARGERS AND MOTOR/GENERATOR

(71) Applicant: EATON CORPORATION, Cleveland, OH (US)

(72) Inventors: Vasilios Tsourapas, Northville, MI (US); Robert Philip Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 844 days.

(21) Appl. No.: 14/348,343

(22) PCT Filed: Sep. 28, 2012

(86) PCT No.: PCT/US2012/057706
§ 371 (c)(1),
(2) Date: Mar. 28, 2014

(87) PCT Pub. No.: WO2013/049438
PCT Pub. Date: Apr. 4, 2013

(65) Prior Publication Data
US 2014/0238361 A1 Aug. 28, 2014

Related U.S. Application Data

(60) Provisional application No. 61/541,609, filed on Sep. 30, 2011, provisional application No. 61/683,942, filed on Aug. 16, 2012.

(51) Int. Cl.
F02B 39/12 (2006.01)
F02B 33/32 (2006.01)
(Continued)

(52) U.S. Cl.
CPC .............. *F02B 33/32* (2013.01); *F02B 33/36* (2013.01); *F02B 33/38* (2013.01); *F02B 39/04* (2013.01);
(Continued)

(58) Field of Classification Search
CPC ........ F02B 33/36; F02B 33/38; F02B 37/007; F02B 37/04; F02B 37/10; F02B 37/14; F02B 39/10; F02B 39/12; F02B 2037/162
See application file for complete search history.

(56) References Cited

U.S. PATENT DOCUMENTS 1,752,224 A 3/1930 Apple
1,878,210 A 9/1932 Vincent
(Continued)

FOREIGN PATENT DOCUMENTS

CN 1982670 A 6/2007
CN 101326068 A 12/2008
(Continued)

OTHER PUBLICATIONS

International Search Report for corresponding International Patent Application No. PCT/US2012/057702 mailed Dec. 3, 2012.
(Continued)

*Primary Examiner* — Jonathan Matthias
(74) *Attorney, Agent, or Firm* — Merchant & Gould P.C.

(57) ABSTRACT

An assembly for controlling air flow to an engine includes a first supercharger (20) and a second supercharger (22). The superchargers are arranged in parallel with one another and in series with the throttle (70) in the air flow to the engine cylinders, and are configured to be operatively connectable with the engine upstream in the air flow to the cylinders. The assembly includes a load device (38) selectively connectable to the first supercharger (20) and selectively alternately operable to provide energy to or receive energy from the first
(Continued)

supercharger. The superchargers are configured to be separately selectively operatively connectable with the throttle and the crankshaft to enable different modes of operation.

23 Claims, 2 Drawing Sheets

(51) Int. Cl.
*F02B 33/36* (2006.01)
*F02B 33/38* (2006.01)
*F02N 11/00* (2006.01)
*F02N 11/04* (2006.01)
*F02N 11/08* (2006.01)
*F02B 39/04* (2006.01)
*F02B 39/10* (2006.01)
*F02N 15/02* (2006.01)
*F02D 41/00* (2006.01)

(52) U.S. Cl.
CPC .............. *F02B 39/10* (2013.01); *F02B 39/12* (2013.01); *F02N 11/003* (2013.01); *F02N 11/04* (2013.01); *F02N 11/0814* (2013.01); *F02D 41/0007* (2013.01); *F02N 15/022* (2013.01); *Y02T 10/48* (2013.01)

(56) References Cited

U.S. PATENT DOCUMENTS

| | | |
|---|---|---|
| 2,358,815 A | 9/1944 | Lysholm |
| 2,390,487 A | 12/1945 | Lawrence et al. |
| 2,400,306 A | 5/1946 | Hobbs |
| 2,402,547 A | 6/1946 | Gilfillan |
| 2,441,779 A | 5/1948 | Troeger et al. |
| 2,467,077 A | 4/1949 | Brunken |
| 2,965,083 A | 12/1960 | Percival |
| 2,975,963 A | 3/1961 | Nilsson |
| 3,180,079 A | 4/1965 | Freeman, Jr. |
| 3,184,155 A | 5/1965 | Crooks |
| 3,391,584 A | 7/1968 | Glamann |
| 3,430,517 A | 3/1969 | Glamann |
| 3,603,853 A | 9/1971 | Mackay |
| 3,676,999 A | 7/1972 | Oldfield |
| 3,741,676 A | 6/1973 | Silvern et al. |
| 3,804,565 A | 4/1974 | Sennet |
| 3,868,822 A | 3/1975 | Keller |
| 3,958,419 A | 5/1976 | Laing |
| 3,976,390 A | 8/1976 | Silvern et al. |
| 4,068,984 A | 1/1978 | Spindler |
| 4,083,188 A | 4/1978 | Kumm |
| 4,478,043 A | 10/1984 | Kobavashi et al. |
| 4,485,310 A | 11/1984 | de Valroger |
| 4,489,242 A | 12/1984 | Worst |
| 4,729,225 A | 3/1988 | Bucher |
| 4,730,457 A | 3/1988 | Yamada et al. |
| 4,825,839 A | 5/1989 | Mehnert |
| 5,121,607 A | 6/1992 | George, Jr. |
| 5,125,806 A | 6/1992 | Quick et al. |
| 5,158,427 A | 10/1992 | Shirai |
| 5,195,881 A | 3/1993 | George, Jr. |
| 5,241,817 A | 9/1993 | George, Jr. |
| 5,263,832 A | 11/1993 | Yamaguchi |
| 5,394,848 A | 3/1995 | Tsutsumi et al. |
| 5,442,918 A | 8/1995 | Baeuerle et al. |
| 5,713,204 A | 2/1998 | Kadlicko |
| 5,791,315 A | 8/1998 | Riach et al. |
| 5,875,766 A | 3/1999 | Ozawa |
| 5,887,434 A | 3/1999 | Arnell et al. |
| 5,890,468 A | 4/1999 | Ozawa |
| 6,048,288 A | 4/2000 | Tsujii et al. |
| 6,537,169 B1 | 3/2003 | Morii |
| 6,631,702 B2 | 10/2003 | Tonnqvist et al. |
| 6,637,203 B2 | 10/2003 | Berglund |
| 6,666,194 B2 | 12/2003 | Wildner |
| 6,684,863 B2 | 2/2004 | Dixon et al. |
| 6,817,349 B2 | 11/2004 | Awasaka et al. |
| 6,845,832 B2 | 1/2005 | Takizawa et al. |
| 6,863,139 B2 | 3/2005 | Egami et al. |
| 6,907,867 B2 | 6/2005 | Igarashi et al. |
| 6,918,250 B2 | 7/2005 | Baeuerle |
| 6,922,995 B2 | 8/2005 | Kawamura et al. |
| 6,938,419 B2 | 9/2005 | Okuyama et al. |
| 7,000,601 B2 | 2/2006 | Yasui et al. |
| 7,102,304 B2 | 9/2006 | Sebille et al. |
| 7,524,263 B2 | 4/2009 | Johnson et al. |
| 7,708,283 B2 | 5/2010 | Azibert et al. |
| 7,748,366 B2 | 7/2010 | Rollinger et al. |
| 7,765,806 B2 | 8/2010 | Clark |
| 7,805,937 B2 | 10/2010 | Cochet et al. |
| 8,087,401 B2 | 1/2012 | Inoue |
| 8,151,773 B2 | 4/2012 | Prior |
| 8,196,686 B2 | 6/2012 | Grieve |
| 8,808,124 B2 | 8/2014 | Major et al. |
| 9,074,524 B2 | 7/2015 | Eybergen et al. |
| 9,534,531 B2 | 1/2017 | Benjey et al. |
| 9,534,532 B2 | 1/2017 | Eybergen et al. |
| 2001/0039230 A1 | 11/2001 | Severinsky et al. |
| 2004/0178636 A1 | 9/2004 | Iwanami et al. |
| 2004/0237949 A1 | 12/2004 | Yasui |
| 2006/0157036 A1 | 7/2006 | Andersen |
| 2007/0051349 A1 | 3/2007 | Marumoto et al. |
| 2007/0074701 A1 | 4/2007 | Mizutani |
| 2007/0137626 A1 | 6/2007 | Turner |
| 2008/0041323 A1 | 2/2008 | Clark |
| 2008/0087482 A1 | 4/2008 | Ledger et al. |
| 2008/0173017 A1 | 7/2008 | St. James |
| 2008/0194375 A1 | 8/2008 | Voigt et al. |
| 2008/0219866 A1* | 9/2008 | Kwong ............... B60K 6/46 417/410.1 |
| 2008/0289610 A1 | 11/2008 | Nguyen-Schaefer et al. |
| 2008/0312803 A1 | 12/2008 | Igarashi et al. |
| 2009/0019852 A1 | 1/2009 | Inoue et al. |
| 2009/0038585 A1 | 2/2009 | Andri |
| 2009/0048745 A1 | 2/2009 | Wu et al. |
| 2009/0222188 A1 | 9/2009 | Igarashi |
| 2009/0277215 A1 | 11/2009 | Tsuboi |
| 2009/0288648 A1 | 11/2009 | Prior et al. |
| 2009/0291803 A1 | 11/2009 | Moeller |
| 2010/0050998 A1 | 3/2010 | Ai et al. |
| 2010/0071673 A1 | 3/2010 | Prior |
| 2010/0155157 A1 | 6/2010 | Grieve |
| 2010/0263375 A1 | 10/2010 | Grieve |
| 2010/0275890 A1 | 11/2010 | McDonald-Walker |
| 2010/0314186 A1 | 12/2010 | Ma |
| 2011/0030641 A1 | 2/2011 | Wu et al. |
| 2011/0067395 A1 | 3/2011 | Suhocki |
| 2011/0083647 A1 | 4/2011 | Hansen et al. |
| 2011/0094480 A1 | 4/2011 | Suhocki et al. |
| 2011/0204654 A1 | 8/2011 | Hansen et al. |
| 2012/0041664 A1 | 2/2012 | Hansen et al. |
| 2013/0089413 A1 | 4/2013 | Fujimoto et al. |
| 2013/0090832 A1 | 4/2013 | Bevan et al. |
| 2013/0146035 A1 | 6/2013 | Eybergen et al. |
| 2013/0255647 A1 | 10/2013 | Akashi et al. |
| 2014/0208745 A1 | 7/2014 | Suhocki et al. |
| 2014/0224228 A1 | 8/2014 | Benjey et al. |
| 2014/0283797 A1 | 9/2014 | Eybergen et al. |
| 2015/0047617 A1 | 2/2015 | Benjey et al. |
| 2015/0066272 A1 | 3/2015 | Benjey et al. |
| 2015/0260187 A1 | 9/2015 | Endo et al. |
| 2015/0330295 A1 | 11/2015 | Walls et al. |
| 2015/0361905 A1* | 12/2015 | Lofgren ............... B60K 6/24 417/34 |
| 2015/0377158 A1 | 12/2015 | Benjey et al. |
| 2016/0001649 A1 | 1/2016 | Benjey |
| 2016/0237880 A1 | 8/2016 | Ouwenga |
| 2016/0319733 A1 | 11/2016 | Benjey et al. |

FOREIGN PATENT DOCUMENTS

| | | |
|---|---|---|
| CN | 201159098 Y | 12/2008 |
| CN | 102072011 A | 5/2011 |
| DE | 32 05 721 A1 | 8/1983 |

(56) References Cited

FOREIGN PATENT DOCUMENTS

| | | |
|---|---|---|
| DE | 38 01 227 A1 | 11/1988 |
| DE | 39 33 409 A1 | 4/1991 |
| DE | 11 2005 000486 T5 | 1/2007 |
| DE | 102010054223 A1 | 3/2012 |
| EP | 0 222 989 A1 | 5/1987 |
| EP | 1 314 884 A2 | 5/2003 |
| EP | 1 462 629 A1 | 9/2004 |
| EP | 1 895 130 A1 | 3/2008 |
| GB | 2 456 600 A | 7/2009 |
| JP | 60001328 A | 1/1985 |
| JP | 60001329 A | 1/1985 |
| JP | 60-075722 A | 4/1985 |
| JP | 61-004889 A | 1/1986 |
| JP | 61-159689 U | 10/1986 |
| JP | 62-101830 A | 5/1987 |
| JP | 2-024042 U | 2/1990 |
| JP | 2-188625 A | 7/1990 |
| JP | 3-179141 A | 8/1991 |
| JP | 3-225028 A | 10/1991 |
| JP | 5-42645 | 6/1993 |
| JP | 5-263649 A | 10/1993 |
| JP | 7-097939 A | 4/1995 |
| JP | 2000-230427 | 8/2000 |
| JP | 2001-073784 A | 3/2001 |
| JP | 2002-357127 | 12/2002 |
| JP | 2003-161156 A | 6/2003 |
| JP | 2004-308646 | 11/2004 |
| JP | 2005-042553 A | 2/2005 |
| JP | 2005-054612 A | 3/2005 |
| JP | 2005-188318 A | 7/2005 |
| JP | 2005-291020 A | 10/2005 |
| JP | 2006-083767 A | 3/2006 |
| JP | 2006-233803 A | 9/2006 |
| JP | 2006-258094 A | 9/2006 |
| JP | 2006-307648 A | 11/2006 |
| JP | 2007-016721 A | 1/2007 |
| JP | 2007-104855 A | 4/2007 |
| JP | 2007-192092 A | 8/2007 |
| JP | 2008-063974 A | 3/2008 |
| JP | 2008-215074 A | 9/2008 |
| JP | 2008-215075 A | 9/2008 |
| JP | 2009-243268 A | 10/2009 |
| JP | 2010-065656 A | 3/2010 |
| KR | 2005-0039187 A | 4/2005 |
| KR | 2007-0005461 A | 1/2007 |
| WO | WO 2004/072449 A1 | 8/2004 |
| WO | WO 2006/134330 A1 | 12/2006 |
| WO | 2008/020184 A1 | 2/2008 |
| WO | 2009/136944 A1 | 11/2009 |
| WO | 2013/049435 A1 | 4/2013 |
| WO | 2013/049439 A2 | 4/2013 |

OTHER PUBLICATIONS

International Search Report for corresponding International Patent Application No. PCT/US2012/057709 mailed Mar. 26, 2013.
International Search Report for corresponding International Patent Application PCT/US2012/057706 mailed Mar. 26, 2013.

* cited by examiner

SUPERCHARGER ASSEMBLY WITH INDEPENDENT SUPERCHARGERS AND MOTOR/GENERATOR

RELATED APPLICATIONS

This application is a National Stage Application of PCT/US2012/057706, filed 28 Sep. 2012, which claims benefit of U.S. Patent Application Ser. No. 61/541,609 filed on 30 Sep. 2011 and U.S. Patent Application Ser. No. 61/683,942 filed on 16 Aug. 2012 and which applications are incorporated herein by reference. To the extent appropriate, a claim of priority is made to each of the above disclosed applications.

TECHNICAL FIELD

The present teachings generally include an engine assembly with two superchargers arranged in parallel and separately drivable to provide different operating modes.

BACKGROUND

Energy efficient engines of reduced size are desirable for fuel economy and cost reduction. Smaller engines provide less torque than larger engines. A supercharger is sometimes used to increase the torque available from an engine. At low engine speeds, when higher torque is often requested by a vehicle operator by depressing the accelerator pedal, the supercharger provides additional air to the engine intake manifold, boosting air pressure and thereby allowing the engine to generate greater torque at lower engine speeds.

SUMMARY

An assembly for controlling air flow to an engine includes a first supercharger and a second supercharger. The superchargers are arranged in parallel with one another and in series with the throttle in the air flow to engine cylinders, and are configured to be operatively connectable with the engine upstream in the air flow to the cylinders. The assembly includes a load device, such as an electric motor/generator, that is selectively alternately operable to provide energy to or receive energy from the first supercharger. The superchargers are configured to be separately selectively operatively connectable with the throttle and the crankshaft to enable different modes of operation. The superchargers are thus decoupled and operable independently of one another to enable flexibility and efficiency in various different modes of operation.

For example, an engine boost mode is available using both superchargers, while a throttle loss regeneration mode is available using only the first supercharger, which may be smaller than the second supercharger. The energy associated with the pressure drop across the throttle is typically unused, and so is referred to as "throttling losses". In the assembly, the pressure drop can be placed across the first supercharger, causing torque on the rotors of the first supercharger that can be utilized (i.e., the throttling losses are "captured", "regenerated", or "recovered") such as by conversion to stored energy. Additional operating modes such as vehicle braking regeneration, engine charging of the battery, and starting of the engine via the motor/generator are also available.

In one aspect of the present teachings a first clutch is selectively engageable to operatively connect the motor/generator with the first supercharger, a second clutch is selectively engageable to operatively connect the crankshaft with the second supercharger. A first valve is positioned in an air inlet passage and is configured to be movable between a first position and a second position. The first valve permits air to flow from the air inlet passage to the first supercharger and prevents air from flowing from the air inlet passage to the second supercharger when the first valve is in the first position. The first valve permits air to flow from the air inlet passage to both the first supercharger and the second supercharger when the first valve is in the second position.

The above features and advantages and other features and advantages of the present teachings are readily apparent from the following detailed description of the best modes for carrying out the present teachings when taken in connection with the accompanying drawings.

DETAILED DESCRIPTION

Figure 1:
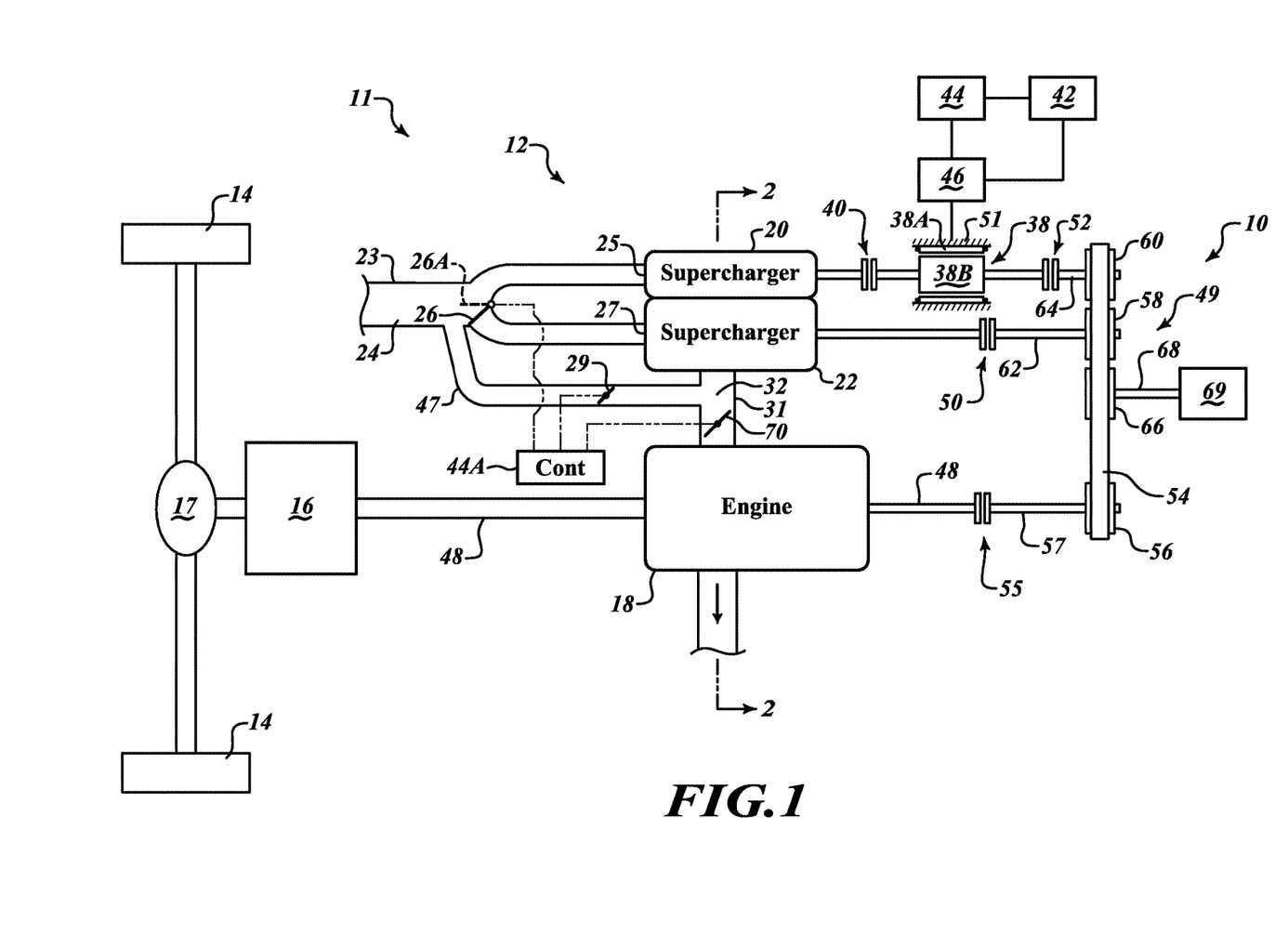
FIG. 1 is a schematic illustration in partial fragmentary view of an assembly on a vehicle having a first and a second supercharger arranged in parallel with one another and operatively connectable to an engine, with a motor/generator operatively connectable to the first supercharger.

Referring to the drawings, wherein like reference numbers refer to like components, a powertrain 10 for a vehicle 11 includes an assembly 12 that provides motive power to vehicle wheels 14 through a transmission 16 and differential 17. The assembly 12 includes an engine 18 that can be an internal combustion engine. The engine 18 has cylinders 19 shown schematically in FIG. 2 in which pistons (not shown) reciprocate when the engine 18 is running (i.e., when the engine 18 is "on"). The assembly 12 has a first supercharger 20 and a second supercharger 22 arranged in parallel with one another in air flow to the engine 18, and upstream in the air flow to the engine 18. As used herein, the first supercharger 20 is "in parallel" with the second supercharger 22 because air can flow to the plenum 32 by passing through the first supercharger 20 or through the second supercharger 22 without necessarily passing through the other supercharger as would be necessary if the superchargers 20, 22 were arranged in series with one another.

As used herein, a first component is "downstream" in air flow from a second component if the direction of air flow requires that the air flow past the second component prior to the first component when air is directed past both components. Similarly, a first component is "upstream" in air flow from a second component if the direction of air flow requires that the air flow past the first component prior to the second component when air is directed past both components. The throttle 70 is shown downstream of the superchargers 20, 22. It should be understood that the functionality of the superchargers 20, 22 described herein can also be achieved if the superchargers 20, 22 were positioned downstream of the throttle 70. In either configuration, the throttle 14 and the superchargers 20, 22 are considered to be in series with one another in the air flow to the engine cylinders 19. Two components are "in series" with one another in the air flow to the engine cylinders 19 when air that flows past one of the components subsequently flows past the other component before flowing to the cylinders. As used herein, the first supercharger 20 is in series with the throttle 70 and the second supercharger 22 is also in series with the throttle 70.

Air may selectively flow to each of the superchargers 20, 22 through an air inlet 24 formed by a passage 23. The superchargers 20, 22 may be fixed displacement superchargers, such as Roots-type superchargers, with each respective set of rotors outputting a fixed volume of air per rotation of the rotors. The increased air output then becomes pressurized when forced into the engine plenum 32, shown in FIG. 2. A Roots-type supercharger is a volumetric device, and therefore is not dependent on rotational speed in order to develop pressure. The volume of air delivered by the Roots-type supercharger per each rotation of the supercharger rotors is constant (i.e., does not vary with speed). A Roots-type supercharger can thus develop pressure at low engine speeds because the Roots-type supercharger functions as a pump rather than as a compressor. Compression of the air delivered by the Roots-type supercharger takes place downstream of the superchargers 20, 22 in the engine plenum 32. By contrast, a centrifugal-type supercharger is dependent on rotational speed in order to develop pressure. A centrifugal-type supercharger compresses the air as it passes through the supercharger but must run at higher speeds than a Roots-type supercharger in order to develop a predetermined pressure.

Figure 2:
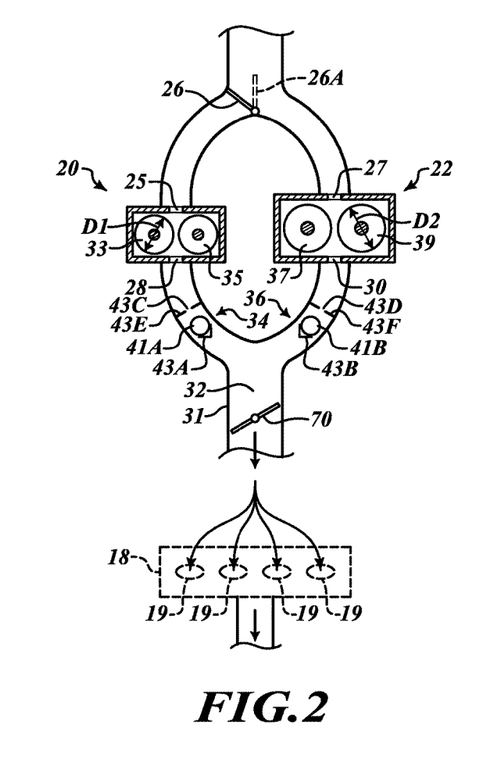
FIG. 2 is a schematic illustration in partial cross-sectional view of the assembly taken at the lines 2-2 in FIG. 1.

A multi-position valve 26 is positioned in the passage 23 and can be controllable to a plurality of positions, including at least a first position shown. When the valve 26 is in the first position, air can flow to the air inlet 24 to an air inlet 25 of the first supercharger 20 but not to an air inlet 27 of the second supercharger 22. The valve 26 can be moved to a second position 26A that allows air flow to the inlets 25, 27 of both of the superchargers 20, 22. As best illustrated in FIG. 2, each of the superchargers 20, 22 has a separate air outlet 28, 30 in fluid communication with the engine plenum 32 that is upstream of cylinders 19 in the engine 18.

Separate one-way flow valves 34, 36, such as ball check valves, can be positioned downstream of each of the air outlets 28, 30 to prevent a back flow of air from the respective outlet 28, 30 of one of the superchargers 20, 22 to the other of the superchargers 20, 22. The each valve 34, 36 includes a check ball 41A, 41B that is confined between a stop 43A, 43B and a portion of the valve body 43E, 43F that has a respective opening 43C, 43D. When the check ball 41A or 41B rests against the stop 43A or 43B in the first position, air can flow past the valve 34 or 36 from the supercharger 20 or 22 to the plenum 32. When air flows through one of the superchargers 20 or 22 in the various operating modes described herein, the valve 34 or 36 downstream of the other supercharger will prevent backflow from the supercharger 20 or 22 through which air is flowing from traveling from the outlet to the inlet of the other supercharger because such back flow will push the respective check ball 41A or 41B against the body 43E or 43F, blocking the opening 43C or 43D.

FIG. 1 shows a bypass valve 29 that can be controllable to directly connect the air flow from the air inlet 24 upstream of the valve 26 to the plenum 32, thus bypassing both superchargers 20, 22. The bypass valve 29 is mounted in a bypass passage 47 that can connect the air inlet 24 to the throttle body 31, bypassing the superchargers 20, 22. The bypass valve 29 allows both superchargers 20, 22 to be bypassed when operating conditions do not require the use of either supercharger 20, 22 (e.g., neither boost nor regeneration is required), and enables quick adjustments in air flow to the engine 18 when needed. When the bypass valve 29 is in a fully closed position, no air can bypass the superchargers 20, 22. When the bypass valve 29 is in the fully open position, the superchargers 20, 22 can be completely bypassed.

The throttle 70 and the bypass valve 29 are shown as butterfly valves that are each pivotable about a respective pivot axis between a closed position and an open position. In the closed position, the throttle 70 or bypass valve 29 is generally perpendicular to the walls of the respective surrounding throttle body 31 or bypass passage 47. In the fully open position, the throttle 70 or bypass valve 29 is generally parallel to the walls of the respective surrounding throttle body 31 or bypass passage 47. This position of the throttle 70 is referred to as wide open throttle. The throttle 70 and bypass valve 29 can also be moved to a variety of intermediate positions between the closed position and the open position. In FIG. 1, the throttle 70 and bypass valve 29 are each shown in an intermediate position. A controller 44 controls the operation of the throttle 70 and bypass valve 29. The controller 44 can be an engine controller.

FIG. 2 shows a first set of rotors 33, 35 of the first supercharger 20, and a second set of rotors 37, 39 of the second supercharger 22. The superchargers 20, 22 can be of different sizes. For example, the first supercharger 20 can be smaller than the second supercharger 22 as it can be designed to deliver less air per rotation of the rotors 33, 35 than the rotors 37, 39. For example, the effective diameter D1 of the rotors 33, 35 can be smaller than the effective diameter D2 of the rotors 37, 39. Assuming that the superchargers 20, 22 are otherwise configured in the same manner, the supercharger 22 would thus output a greater volume of air per rotation than the supercharger 20.

A load device, which is an electric motor/generator 38, can be selectively connectable to the first supercharger 20 by engagement of a selectively engageable first clutch 40. The motor/generator 38 has a stator 38A and a rotor 38B. The stator 38A is mounted to a stationary member 51, such as a motor casing. A battery 42 can be used to provide electric power to the stator 38A when the motor/generator 38 is controlled to function as a motor, and to receive electrical power from the motor/generator 38 when the motor/generator 38 is controlled to function as a generator. One or more vehicle electrical devices 69 can also draw electric power from the battery 42 or can be powered by a separate battery. A controller 44 can control the functioning of the motor/generator 38 as a motor or as a generator. A power inverter 46 can be used to convert the energy supplied by the motor/generator 38 from alternating current to direct current to be stored in the battery 42 when the motor/generator 38 operates as a generator, and from direct current to alternating current when the motor/generator 38 operates as a motor. A single controller could instead be used in the assembly 10. For example, the controller 44 could also control the valve 26 and the throttle 70.

Other load devices can be used to provide power to or receive power from the first supercharger 20. For example, an accumulator or a slippable friction clutch can be operatively connected to the supercharger 20 and controlled to capture throttle loss energy via the supercharger 20. In the case of an accumulator, the energy can be stored as hydraulic or pneumatic pressure. In the case of a slippable friction clutch, the energy can be converted to heat by slipping the clutch, and can then be captured for use in vehicle heating and cooling systems.

The engine 18 has a crankshaft 48 that can be connectable with the transmission 16. The crankshaft 48 can also be selectively connectable with the first and second superchargers 20, 22 through a belt-drive arrangement 49, a second selectively engageable clutch 50, a third selectively engageable clutch 52, and a fourth selectively engageable clutch 55. The clutch 55 can be a normally closed clutch that is selectively powered to an open position (i.e., selectively disengaged). That is, clutch 55 can be biased to a closed position by a spring or other mechanism. The clutch 55 can be selectively disengaged when the engine 18 is off and the vehicle is in a key-on state, such as when the vehicle is stopped at a traffic light, with the engine 18 automatically and temporarily shut-off for fuel savings.

The clutches 40, 50, 52, 55 can be any type of clutches, including hydraulic friction clutches, dog clutches, etc. The clutches 40, 50, 52, 55 can be controlled by the controller 44 used to control the valve 26 and the throttle 70. The connections from the controller 44 to the clutches 40, 50, 52, 55 are not shown for simplicity in the drawings. Alternatively, the clutches 40, 50, 52, 55 can be controlled by the controller 44 used to control the motor/generator 52, or by a separate controller.

The belt drive arrangement 49 can include a belt 54 is engaged with a pulley 56. The pulley 56 can rotate with a shaft 57 that rotates at the same speed as the crankshaft 48 when clutch 55 is not disengaged. The belt 54 is also engaged with pulleys 58 and 60. Pulley 58 can rotate with shaft 62 at the same speed as the rotors 37, 39 of the second supercharger 22 when the second clutch 50 is engaged. Pulley 60 can rotate with shaft 64 at the same speed as the rotor 38B of the motor/generator 38 when the third clutch 52 is engaged. Belt 54 can also be engaged with pulley 66 that rotates with shaft 68. Shaft 68 can be operatively connected to one or more vehicle accessories 69. The belt drive arrangement 49 with the accessory 69 can be connectable with the crankshaft 48 on the front side of the engine 18, opposite the side of the engine 18 on which the transmission 16 connects to the crankshaft 48. Accordingly, the belt drive arrangement 49 can be referred to as a front engine accessory drive.

By controlling the valve 26, the bypass valve 29, the throttle 70, the clutches 40, 50, 52, 55, and the motor/generator 38, several operating modes can be achieved that enable efficient operation of the powertrain 10. For example, under a first set of engine operating conditions, when engine operating demands require relatively high engine torque in order to provide a desired intake air pressure to the engine cylinders 19, such as at low engine speeds when vehicle acceleration is desired, a boost operating mode can be established by placing the valve 26 in the second position 26A, engaging clutch 40 to connect the motor/generator 38 with the first supercharger 20, and engaging clutch 50 to connect the second supercharger 22 with the crankshaft 48 through the belt drive arrangement 49. Clutch 55 remains closed. The controller 44 can control the motor/generator 38 to function as a motor to provide mechanical power to the supercharger 20. The crankshaft 48 powers the supercharger 22 through the belt drive arrangement 49. Air flows to the inlets 25, 27 of both superchargers 20, 22 and on to the throttle body 31, and both superchargers 20, 22 thereby contribute to the desired boost to the engine 18.

Under a second set of engine operating conditions that indicate a state-of-charge of the battery 42 is below a predetermined maximum state-of-charge and engine boost is not necessary, such as during vehicle cruising, a throttle regeneration mode can be established. In the throttle regeneration mode, at least a portion of a pressure differential that occurs across a throttle 70 of the engine 18 can be shifted at least in part to the first supercharger 20. This can be accomplished by placing the valve 26 in the first position so that air flow to the engine 18 is only through the first supercharger 20, and by opening the throttle 70 to the fully open position. The pressure differential thus established between the inlet 25 and the outlet 28 of the supercharger 20 will create torque on the rotors 33, 35, and thus also on the rotor 38A of the motor/generator 38 when the clutch 40 is engaged and the motor/generator 38 is controlled to function as a generator. Clutches 50 and 52 remain open and clutch 55 remains closed. The pressure differential across the throttle 70 is due to the pressure difference between the incoming air that must travel past the nearly-closed throttle 70, and the vacuum on the opposite side to the throttle 70 created by reciprocating engine pistons in the cylinders 19. The pressure drop at the throttle 70 is referred to as "throttling losses" because of the inefficiency created by the turbulence in air flow around the throttle 70 at low throttle conditions. In the throttling loss regeneration mode, at least a portion of the throttling losses can be captured as stored electrical energy in the battery 42.

The various engine operating conditions under which the various operating modes discussed herein are established can be determined by sensors connected with the controller 44 or controller 44A and in operative connection with various components such as the battery 42 to determine a battery state-of-charge, with the crankshaft 48 to determine crankshaft torque, etc.

A smooth transition between the boost mode and the throttling loss regeneration mode is possible because the only required change in clutch states to shift from the boost mode to the throttling loss regeneration mode is the disengagement of clutch 50. Shifting between the boost mode and the regeneration mode can be accomplished smoothly with minimal torque fluctuations by using the controller 44A to slip the clutch 50 when engaging or disengaging the clutch 50.

The smaller supercharger 20 can be sized to provide an appropriate air mass flow to the engine 18 during the throttling loss regeneration mode, while the use of both the larger supercharger 22 and the smaller supercharger 20 during the boost mode can provide a relatively greater air mass flow required for boost, especially with a relatively small engine. By configuring the assembly 12 so that the superchargers 20, 22 are able to separately function to provide the required operating modes, different engine air needs of the different modes are met. Typically, greater air flow is required to the engine during the boost mode than during the regeneration mode. Because the assembly 12 allows both superchargers 20, 22 to be used during the boost mode, while enabling use of only the smaller supercharger 22 during the throttling loss regeneration mode, the engine operating needs are efficiently met. Decoupling of the supercharger 20 from the engine 18 by the selectively engageable clutches 40 and 52 can potentially improve vehicle drivability and simplify controllability of the engine assembly 12. Because the motor/generator 38 powers the supercharger 20, no torque drag on the crankshaft 48 will occur when the clutch 40 is engaged and clutch 52 is disengaged. Furthermore, the motor/generator 38 can be controlled to bring both sides of the clutch 52 to the same speed before engaging clutch 52, thus minimizing any torque fluctuations at the crankshaft 48 related to engagement of the clutch 52. Similarly, clutch 50 can be slipped to ease engagement and minimize associated torque fluctuation at the crankshaft 48 when the supercharger 22 is connected with the belt drive 49 by engagement of the clutch 50. Using the motor/generator 38 to ease transitions between modes requiring engagement or disengagement of clutch 52, and using controlled slip to engage clutch 50 can potentially improve drivability and avoid the need for more expensive clutches.

Two additional modes can be used for charging the battery 42. An engine-based battery charging mode can be established when clutch 52 is engaged and clutch 40 is not engaged and clutch 50 is not engaged. Clutch 55 is not disengaged so that it remains closed. The motor/generator 38 can be controlled to function as a generator. Torque from the crankshaft 48 can thus be transferred to the motor/generator 38 through the belt drive arrangement 49 and then converted to electric energy stored in the battery 42. The bypass valve 29 can be opened to allow air to bypass both superchargers 20, 22 during this mode.

A regenerative braking mode can be established with the same clutch engagements as the engine-based battery charging mode (i.e., clutch 52 engaged, clutches 40 and 50 not engaged, and clutch 55 not disengaged). During vehicle braking, control of the motor/generator 38 as a generator places a load on the shaft 64, slowing the crankshaft 48 through the belt drive arrangement 49, and recapturing braking energy as stored electric energy in the battery 42 during a vehicle braking regeneration mode.

Additionally, the motor/generator 38 can be controlled to operate as a motor to restart the engine 18, such as from a stop at a traffic light at which the engine 18 is temporarily shutoff to reduce fuel consumption. In the engine start/stop mode, clutch 52 is engaged, clutch 55 remains closed (i.e., is not disengaged so that it remains in its normally-engaged state), and clutches 40 and 50 are not engaged. Torque can be transferred from the motor/generator 38 through the belt drive arrangement 49 to the crankshaft 48 to turn the crankshaft 48 and thereby start the engine 18. This is referred to as an engine start/stop mode.

In another aspect of the present teachings, when the engine 18 is off and the key is in the vehicle ignition, such as in a start-stop mode at a traffic light, the clutch 55 can be powered open and clutch 52 engaged, with the motor/generator 38 controlled to function as a motor to power the vehicle accessories 69 through the belt drive arrangement 49.

The reference numbers used in the drawings and the specification and the corresponding components are as follows:

10 powertrain
11 vehicle
12 assembly
14 wheels
16 transmission
17 differential
18 engine
19 cylinders
20 first supercharger
22 second supercharger
23 passage
24 air inlet
25 air inlet of first supercharger
26 valve
26A second position
27 air inlet of second supercharger
28 air outlet of first supercharger
29 bypass valve
30 air outlet of second supercharger
31 throttle body
32 plenum
33 rotor
34 one-way flow valve
35 rotor
36 one-way flow valve
37 rotor
38 motor/generator
38A stator
38B rotor
39 rotor
40 first clutch
41A check ball
41B check ball
42 battery
43A stop
43B stop
43C opening
43D opening
43E valve body
43F valve body
44 controller
44A controller
46 power inverter
47 bypass passage
48 crankshaft
49 belt drive arrangement
50 second clutch
51 stationary member
52 third clutch
54 belt
55 fourth clutch
56 pulley
57 shaft
58 pulley
60 pulley
62 shaft
64 shaft
66 pulley
68 shaft
69 vehicle accessory
70 throttle
D1 effective diameter of rotors of first supercharger
D2 effective diameter of rotors of second supercharger While the best modes for carrying out the many aspects of the present teachings have been described in detail, those familiar with the art to which these teachings relate will recognize various alternative aspects for practicing the present teachings that are within the scope of the appended claims.

What is claimed is:

1. An assembly for controlling air flow to an engine having a crankshaft, cylinders, and a throttle in a throttle body upstream in air flow to the cylinders, the assembly comprising:
    a first supercharger;
    a second supercharger; and
    a load device selectively connectable to the first supercharger and alternately operable to provide energy to or receive energy from the first supercharger;
    wherein the first and second superchargers are arranged in parallel with one another and in series with the throttle in the air flow to the cylinders and are configured to be operatively connectable with the engine upstream in the air flow to the cylinders; and
    wherein the first and second superchargers are configured to be separately selectively operatively connectable with the throttle and the crankshaft to enable different modes of operation.

2. The assembly of claim 1, wherein the first supercharger is configured with rotors of a first effective diameter and the second supercharger is configured with rotors of a second effective diameter larger than the first effective diameter such that the second supercharger outputs a greater volume of air per rotation.

3. The assembly of claim 1, wherein the load device is a motor/generator selectively alternately operable as a motor and as a generator, and further comprising:
a first clutch selectively engageable to operatively connect the motor/generator with the first supercharger;
a second clutch selectively engageable to operatively connect the crankshaft with the second supercharger;
an air inlet passage; and
a first valve positioned in the air inlet passage and configured to be movable between a first position and a second position, wherein the first valve permits air to flow from the air inlet passage to the first supercharger and prevents air from flowing from the air inlet passage to the second supercharger when the first valve is in the first position; wherein the first valve permits air to flow from the air inlet passage to both the first supercharger and the second supercharger when the first valve is in the second position;
wherein, when the first valve is in the second position, the first clutch is engaged, the second clutch is engaged, and the motor/generator is operated as a motor during a first set of engine operating conditions to provide engine boost using both the first and the second superchargers; and
wherein, when the first valve is in the first position, the first clutch is engaged, and the motor/generator is operated as a generator during a second set of engine operating conditions to provide regeneration of throttling losses with air flow to the cylinders using only the first supercharger.

4. The assembly of claim 3, further comprising:
a controller operatively connected to the motor/generator and configured to control the motor/generator to alternately function as a motor and as a generator; and
a battery operatively connected to the controller and the motor/generator and configured to store energy converted from torque on the rotors when the motor/generator is controlled to function as a generator;
wherein the second set of engine operating conditions include a state-of-charge of the battery less than a predetermined maximum state-of-charge.

5. The assembly of claim 1, wherein the load device is a motor/generator selectively alternately operable as a motor and as a generator; and further comprising:
a first clutch selectively engageable to operatively connect the motor/generator with the first supercharger;
a second clutch selectively engageable to operatively connect the crankshaft with the second supercharger;
an air inlet passage;
a first valve positioned in the air inlet passage and configured to be movable between a first position and a second position, wherein the first valve permits air to flow from the air inlet passage to the first supercharger and prevents air from flowing from the air inlet passage to the second supercharger when the first valve is in the first position, and wherein the first valve permits air to flow from the air inlet passage to both the first supercharger and the second supercharger when the first valve is in the second position; and
a third clutch selectively engageable to operatively connect the crankshaft with the motor/generator, the crankshaft thus being operatively connected with the first supercharger when the first and third clutches are engaged, the first and second superchargers thus being separately operatively connected with the crankshaft by the first, the second, and the third clutches.

6. The assembly of claim 5, further comprising:
a controller operatively connected to the motor/generator and configured to control the motor/generator to alternately function as a motor and as a generator; and
a battery operatively connected to the controller and the motor/generator and configured to store energy converted from torque on the rotors when the motor/generator is controlled to function as a generator;
wherein a speed of the motor/generator is controlled by the controller so that the third clutch is engaged without slip.

7. The assembly of claim 5, further comprising:
a controller operatively connected to the motor/generator and configured to control the motor/generator to alternately function as a motor and as a generator; and
a battery operatively connected to the controller and the motor/generator and configured to store energy converted from torque on the rotors when the motor/generator is controlled to function as a generator;
wherein the battery is charged using torque of the crankshaft when the motor/generator is controlled by the controller to function as a generator and the third clutch is engaged.

8. The assembly of claim 1, wherein the load device is a motor/generator selectively alternately operable as a motor and as a generator; and further comprising:
a first clutch selectively engageable to operatively connect the motor/generator with the first supercharger;
a second clutch selectively engageable to operatively connect the crankshaft with the second supercharger;
an air inlet passage;
a first valve positioned in the air inlet passage and configured to be movable between a first position and a second position, wherein the first valve permits air to flow from the air inlet passage to the first supercharger and prevents air from flowing from the air inlet passage to the second supercharger when the first valve is in the first position, and wherein the first valve permits air to flow from the air inlet passage to both the first supercharger and the second supercharger when the first valve is in the second position; and
a controller operatively connected to the motor/generator and configured to control the motor/generator to alternately function as a motor and as a generator;
wherein a speed of the motor/generator is controlled by the controller so that the second clutch is slipped during engagement.

9. The assembly of claim 8, further comprising:
a bypass passage connecting the air inlet passage with the throttle body and bypassing both of the first and second superchargers; and
a bypass valve positioned in the bypass passage and configured to be movable between an open position and a closed position; wherein the bypass valve permits air to flow from the air inlet passage to the throttle body when in the open position and prevents air from flowing from the air inlet passage to the throttle body through the bypass passage when the bypass valve is in the closed position;
wherein the bypass valve is in the open position when a battery is charged using torque of the crankshaft so that air flow from the air inlet bypasses the first and second superchargers.

10. The assembly of claim 1, wherein the load device is a motor/generator selectively alternately operable as a motor and as a generator; and further comprising:

a controller operatively connected to the motor/generator and configured to control the motor/generator to alternately function as a motor and as a generator;

a battery operatively connected to the controller and the motor/generator and configured to store energy converted from torque on the rotors when the motor/generator is controlled to function as a generator;

a first clutch selectively engageable to operatively connect the motor/generator with the first supercharger, a second clutch selectively engageable to operatively connect the crankshaft with the second supercharger;

a third clutch selectively engageable to operatively connect the crankshaft with the motor/generator; and a fourth clutch selectively disengageable to operatively disconnect the crankshaft from both of the first and second superchargers and the motor/generator;

wherein at least one vehicle electrical device is operatively connected to the battery and is configured to receive stored energy from the battery; and wherein said at least one vehicle electrical device receives stored energy from the battery when the third clutch is engaged, the fourth clutch is disengaged, and the motor/generator is controlled to function as a motor to power said at least one vehicle electrical device when the engine is off.

11. The assembly of claim 1, further comprising:
a first check valve positioned between an outlet of the first supercharger and the throttle; and
a second check valve positioned between an outlet of the second supercharger and the throttle;
wherein each of the first and second check valves is configured to prevent backflow of air to the first and second superchargers when either of the first and second superchargers boosts air flow to the cylinders.

12. An assembly for controlling air flow to an engine having a crankshaft, cylinders, and a throttle in a throttle body in air flow to the cylinders, the assembly comprising:
a first supercharger with a first set of rotors;
a second supercharger with a second set of rotors configured to output a greater volume of air per rotation than the first set of rotors;
an electric motor/generator selectively alternately operable as a motor and as a generator;
an air inlet passage;
a first valve positioned in the air inlet passage and configured to be movable between a first position and a second position, wherein the first valve permits air to flow from the air inlet passage to the first supercharger and prevents air from flowing from the air inlet passage to the second supercharger when the first valve is in the first position, and wherein the first valve permits air to flow from the air inlet passage to both the first supercharger and the second supercharger when the first valve is in the second position;
a first clutch selectively engageable to operatively connect the electric motor/generator with the first supercharger; and
a second clutch selectively engageable to operatively connect the crankshaft with the second supercharger, the electric motor/generator thereby driving the first supercharger when the first clutch is engaged and the electric motor/generator functions as a motor, and the crankshaft driving the second supercharger when the second clutch is engaged so that both of the first and second superchargers boost air flow to the cylinders in a boost operating mode;

wherein the first and second superchargers are arranged in parallel with one another in the air flow to the cylinders and are configured to be operatively connectable with the engine upstream in the air flow to the cylinders; and wherein the first clutch is engaged and the throttle opens so that a pressure drop across the throttle shifts to the first supercharger and the electric motor/generator is controlled to function as a generator to recover throttling losses in a throttling loss regeneration operating mode.

13. The assembly of claim 12, further comprising a third clutch selectively engageable to operatively connect the crankshaft with the electric motor/generator, the crankshaft thus being operatively connected with the first supercharger when the first and third clutches are engaged, the first and second superchargers thus being separately operatively connectable with the crankshaft by the first and the third clutches.

14. The assembly of claim 13, further comprising:
a controller operatively connected to the electric motor/generator and configured to control the electric motor/generator to alternately function as a motor and as a generator;
a battery operatively connected to the controller and the electric motor/generator and configured to store energy converted from torque on the rotors when the electric motor/generator is controlled to function as a generator; and
a fourth clutch selectively disengageable to operatively disconnect the crankshaft from both of the first and second superchargers and the electric motor/generator;
wherein at least one vehicle electrical device is operatively connected to the battery and is configured to receive stored energy from the battery; and
wherein said at least one vehicle electrical device receives stored energy from the battery when the fourth clutch is disengaged, the third clutch is engaged, and the electric motor/generator is controlled to function as a motor to power said at least one vehicle electrical device when the engine is off.

15. The assembly of claim 12, further comprising:
a first check valve positioned between an outlet of the first supercharger and the throttle; and
a second check valve positioned between an outlet of the second supercharger and the throttle;
wherein each of the first and second check valves is configured to prevent backflow when either of the first and second superchargers boosts air flow to the cylinders.

16. An assembly for controlling air flow to an engine, the assembly comprising:
a first supercharger with a first set of rotors;
a second supercharger with a second set of rotors configured to output a greater volume of air per rotation than the first set of rotors;
an electric motor/generator selectively alternately operable as a motor and as a generator;
an air inlet passage;
a first valve positioned in the air inlet passage and configured to be movable between a first position and a second position, wherein the first valve permits air to flow from the air inlet passage to the first supercharger and prevents air from flowing from the air inlet passage to the second supercharger when the first valve is in the first position, and wherein the first valve permits air to flow from the air inlet passage to both the first supercharger and the second supercharger when the first valve is in the second position;
a first clutch selectively engageable to operatively connect the electric motor/generator with the first supercharger;
a second clutch selectively engageable to operatively connect the crankshaft with the second supercharger, the electric motor/generator thereby driving the first supercharger when the first clutch is engaged and the electric motor/generator functions as a motor, and the crankshaft driving the second supercharger when the second clutch is engaged so that both of the first and second superchargers boost air flow to cylinders of the engine in a boost operating mode;
a third clutch selectively engageable to operatively connect the crankshaft with the electric motor/generator;
a controller operatively connected to the electric motor/generator and configured to control the electric motor/generator to alternately function as a motor and as a generator;
a battery operatively connected to the controller and the electric motor/generator and configured to store energy converted from torque on the rotors when the electric motor/generator is controlled to function as a generator;
a fourth clutch selectively disengageable to operatively disconnect the crankshaft from both of the first and second superchargers and the electric motor/generator;
a first check valve positioned between an outlet of the first supercharger and a throttle of the engine; and
a second check valve positioned between an outlet of the second supercharger and the throttle;
wherein the first and second superchargers are arranged in parallel with one another in the air flow to the cylinders and are configured to be operatively connectable with the engine upstream in the air flow to the cylinders; and
wherein, when the first clutch is engaged and the throttle opens, a pressure drop across the throttle shifts to the first supercharger and the electric motor/generator is controlled to function as a generator to recover throttling losses in a throttling loss regeneration operating mode;
wherein the crankshaft is operatively connected with the first supercharger when the first and third clutches are engaged, the first and second superchargers thus being separately operatively connectable with the crankshaft by the first and the third clutches;
wherein at least one vehicle electrical device is operatively connected to the battery and is configured to receive stored energy from the battery;
wherein said at least one vehicle electrical device receives stored energy from the battery when the fourth clutch is disengaged, the third clutch is engaged, and the electric motor/generator is controlled to function as a motor to power said at least one vehicle electrical device when the engine is off; and
wherein each of the first and second check valves is configured to prevent backflow when either of the first and second superchargers boosts air flow to the cylinders.

17. The assembly of claim 16, wherein the first supercharger is configured with rotors of a first effective diameter and the second supercharger is configured with rotors of a second effective diameter larger than the first effective diameter such that the second supercharger outputs a greater volume of air per rotation.

18. The assembly of claim 16, wherein the battery is charged using torque of the crankshaft when the motor/generator is controlled by the controller to function as a generator and the third clutch is engaged.

19. The assembly of claim 16, wherein a speed of the motor/generator is controlled by the controller so that the second clutch is slipped during engagement.

20. The assembly of claim 16, further comprising:
a bypass passage connecting the air inlet passage with a throttle body and bypassing both of the first and second superchargers; and
a bypass valve positioned in the bypass passage and configured to be movable between an open position and a closed position; wherein the bypass valve permits air to flow from the air inlet passage to the throttle body when in the open position and prevents air from flowing from the air inlet passage to the throttle body through the bypass passage when the bypass valve is in the closed position;
wherein the bypass valve is in the open position when the battery is charged using torque of the crankshaft so that air flow from the air inlet bypasses the first and second superchargers.

21. An assembly for controlling air flow to an engine having a crankshaft, cylinders, and a throttle in a throttle body upstream in air flow to the cylinders, the assembly comprising:
a first supercharger;
a second supercharger; and
an electric motor/generator selectively connectable to the first supercharger and alternately operable to provide energy to or receive energy from the first supercharger;
wherein the first and second superchargers are arranged in parallel with one another and in series with the throttle in the air flow to the cylinders and are configured to be operatively connectable with the engine upstream in the air flow to the cylinders; and
wherein the first and second superchargers are configured to be separately selectively operatively connectable with the throttle and the crankshaft to enable different modes of operation.

22. The assembly of claim 21, wherein the first supercharger is configured with rotors of a first effective diameter and the second supercharger is configured with rotors of a second effective diameter larger than the first effective diameter such that the second supercharger outputs a greater volume of air per rotation.

23. The assembly of claim 21, further comprising:
a first check valve positioned between an outlet of the first supercharger and the throttle; and
a second check valve positioned between an outlet of the second supercharger and the throttle;
wherein each of the first and second check valves is configured to prevent backflow of air to the first and second superchargers when either of the first and second superchargers boosts air flow to the cylinders.

* * * * *